United States Patent
Henschel et al.

(10) Patent No.: US 12,151,129 B2
(45) Date of Patent: Nov. 26, 2024

(54) FIRE-RETARDANT BAG FOR ACCOMMODATING FLAMMABLE DEVICES OR ENERGY STORES

(71) Applicant: Innovint Aircraft Interior GmbH, Hamburg (DE)

(72) Inventors: Lars Henschel, Hamburg (DE); Ingo Asmus, Uetersen (DE)

(73) Assignee: Innovint Aircraft Interior GmbH, Hamburg (DE)

( * ) Notice: Subject to any disclaimer, the term of this patent is extended or adjusted under 35 U.S.C. 154(b) by 364 days.

(21) Appl. No.: 17/620,646

(22) PCT Filed: Jun. 8, 2020

(86) PCT No.: PCT/EP2020/065813
§ 371 (c)(1),
(2) Date: Dec. 17, 2021

(87) PCT Pub. No.: WO2020/254131
PCT Pub. Date: Dec. 24, 2020

(65) Prior Publication Data
US 2022/0355137 A1 Nov. 10, 2022

(30) Foreign Application Priority Data
Jun. 20, 2019 (DE) .......................... 202019103451.3

(51) Int. Cl.
*A62C 3/06* (2006.01)
*A45C 13/02* (2006.01)

(52) U.S. Cl.
CPC ................ *A62C 3/06* (2013.01); *A45C 13/02* (2013.01); *A45C 2013/025* (2013.01)

(58) Field of Classification Search
CPC ...... A62C 3/06; A45C 13/02; A45C 2013/025
See application file for complete search history.

(56) References Cited

U.S. PATENT DOCUMENTS

| | | | |
|---|---|---|---|
| 9,303,950 B2 * | 4/2016 | Fuller | A45C 11/16 |
| 9,469,440 B1 * | 10/2016 | Flood | A45C 13/008 |
| 2004/0022455 A1 * | 2/2004 | Reason | A45C 13/18 |
| | | | 383/102 |
| 2009/0014490 A1 * | 1/2009 | Bradley | A45F 3/04 |
| | | | 224/576 |

(Continued)

FOREIGN PATENT DOCUMENTS

| | | |
|---|---|---|
| CN | 202557965 U | 11/2012 |
| CN | 206493747 U | 9/2017 |
| CN | 108609279 A | 10/2018 |

*Primary Examiner* — Derek J Battisti
(74) *Attorney, Agent, or Firm* — Thomas M. Freiburger

(57) ABSTRACT

The invention relates to a fire-retardant bag (1) for accommodating flammable devices or energy stores, in particular lithium-ion batteries, having an interior (10) for accommodating such a device or energy store and having a wall surrounding the interior (10). The wall is flexible and of multi-layer design with at least one layer of fire-retardant material which withstands a temperature emanating from the interior (10) of >800° C. According to the invention, the wall has a layered structure in the form of a layer of textile material and at least one following layer of silica fibre material or silica woven fabric material.

9 Claims, 3 Drawing Sheets

(56) References Cited

U.S. PATENT DOCUMENTS

| | | | |
|---|---|---|---|
| 2009/0190865 A1* | 7/2009 | Chang | A45C 3/001 383/110 |
| 2009/0266722 A1* | 10/2009 | Rogers | B65D 81/1275 206/521 |
| 2010/0027920 A1 | 2/2010 | Raidl et al. | |
| 2019/0298046 A1* | 10/2019 | Duncan | A45F 5/02 |

* cited by examiner

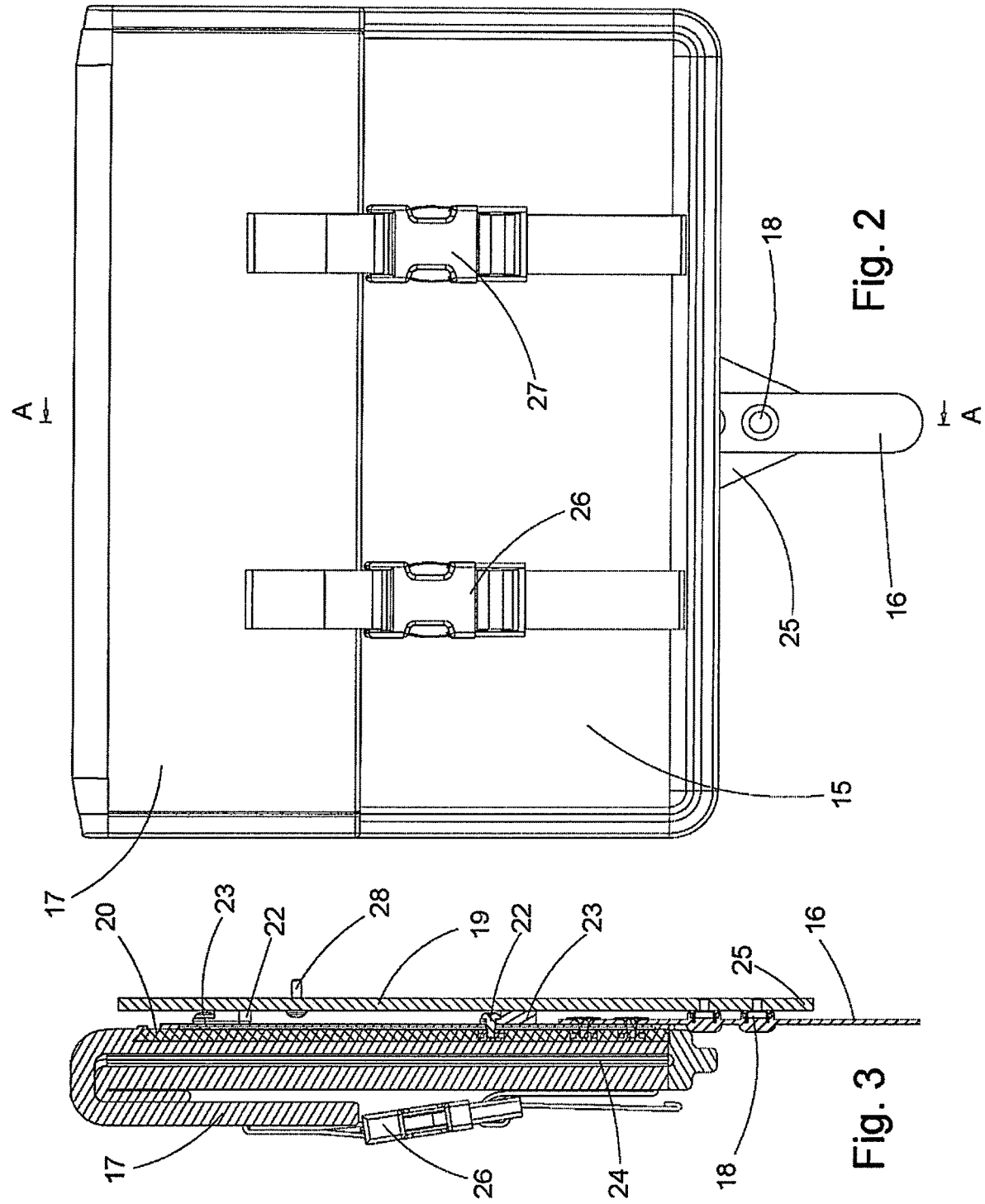

FIRE-RETARDANT BAG FOR ACCOMMODATING FLAMMABLE DEVICES OR ENERGY STORES

The invention relates to a fire-retardant pocket or bag for receiving inflammatory devices or energy stores, in particular lithium-ion batteries, according to the preamble of claim 1.

Many of today's communication devices and other electronic units use batteries or accumulators for supplying energy. The use of lithium batteries has proven to be particularly advantageous since these have a high energy density and specific energy, a high cell voltage and low self-discharge and can be used in wide temperature ranges. In addition to lithium batteries, rechargeable lithium-ion accumulators are also widely used. In the following, both types are called batteries.

The use of lithium batteries with their very high storage density requires special safety measures in the shipping and transport of such batteries or devices which contain such batteries. There is a high risk of fire in the event of a short circuit or water intrusion, in particular triggered by mechanical or extreme thermal action, production errors or the like. Therefore, they are subject to special safety regulations, in particular in the aviation industry, because fire events in aircraft can lead to disasters. Lithium batteries must therefore not be transported in checked luggage, for example, but can be carried by passengers in hand luggage.

Pilots of an aircraft also increasingly use tablet computers in the cockpit (so-called EFB, electronic flight bags) in order to keep flight data such as maps, on-board books, etc. stored thereon. Therefore, devices operated with lithium energy are also increasingly found in particularly safety-critical regions of an aircraft.

In the event of a defect of a lithium energy store, it is not only possible to produce a fire, but on the basis of the hermetically sealed construction of such energy stores such a defect can lead to an exothermic explosion with unforeseeable consequences. The temperatures arising can exceed 800° C. so that extinguishing with standard means is difficult or even impossible.

There is accordingly a great need to secure energy storage devices operated with lithium batteries as well as possible.

Various receiving containers are already known in which such energy stores or devices containing them can be accommodated.

A fire-resistant pocket for electronic devices is known from the Unionsgeschmacksmuster (design registration) 00267084-0001, with which the risk of fire and explosion could be greatly reduced within an energy store accommodated in the pocket.

A case for receiving critical energy stores is known from WO 2014/074113A1, in which integrated filters for smoke filtering and gas removal are employed in the case. However, such a case is very bulky and heavy, so that it cannot be used in the cockpit of an aircraft.

EP2471125B1 describes a container for receiving an energy store and for securing in the case of an exothermic process, in which the wall of the container is formed from a layer structure which contains a first layer of woven ceramic material and a second layer made of a material which has oxidized polyacrylonitrile fibers. When ceramic materials are used, however, the risk of cancer must be considered as increased.

The aim of the invention is to provide a fire-retardant bag or pocket for receiving inflammatory devices or energy stores, in particular lithium batteries or lithium ion accumulators, which is of simple design, is of low weight and small volume, which can be used for exothermically produced temperatures above 800° C. and which meets the special requirements of the aviation industry both in civil and military applications.

This object is achieved by the invention specified in claim 1. Further features of the invention are specified in dependent claims.

The invention relates to a bag having an interior for receiving a device or energy store and having a wall surrounding the interior, wherein the wall is flexible and multi-layered with at least one layer of fire-retardant material which resists a temperature of >800° C. emanating from the interior.

The invention provides further that the wall has a layered structure in the form of a layer of textile material, preferably cotton material, and at least one layer of silica fiber or silica fabric material which follows on said layer, wherein the interior can be closed in relation to the surroundings.

In the invention, a plate-shaped stabilizing element is used, arranged in or on the rear side of the bag, in particular in a rear-side insertion pocket, by means of which the bag can be fastened to a retaining plate arranged parallel, which in turn is fastened to a partition, a monument or another structural element of the aircraft. Releasable securing elements are provided between the stabilizing element and the retaining plate. By means of a securing device, the stabilizing element and the retaining plate can be secured against each other, so that a removal of the bag from the retaining plate is possible only after manual release of the securing device, in particular a secure snap fastener.

A zipper is preferably used for the simple opening and closing of the bag. Alternatively or additionally, a Velcro strip can be used. When a zipper is used, a Velcro strip can additionally cover the zipper, in particular in its end regions.

The bag preferably contains outer holding elements for fastening to aircraft structural components. In addition, it is advantageous if the bag contains a carrying element, such as a carrying strap.

In a special embodiment of the invention, the bag opening is provided with a cover flap which is fastened to an opening edge of the bag and overlaps the opening in the manner of an office briefcase.

This embodiment can be used in particular for use in the cockpit or in the passenger area of an aircraft.

The invention is explained in more detail below on the basis of an exemplary embodiment. The figures show:

FIG. 2 is a plan view of the bag according to FIG. 1,

FIG. 3 shows a sectional view of the bag according to FIG. 2 along the line A-A.

The views shown in FIGS. 1-4 are highly simplified representations.

Figure 1:
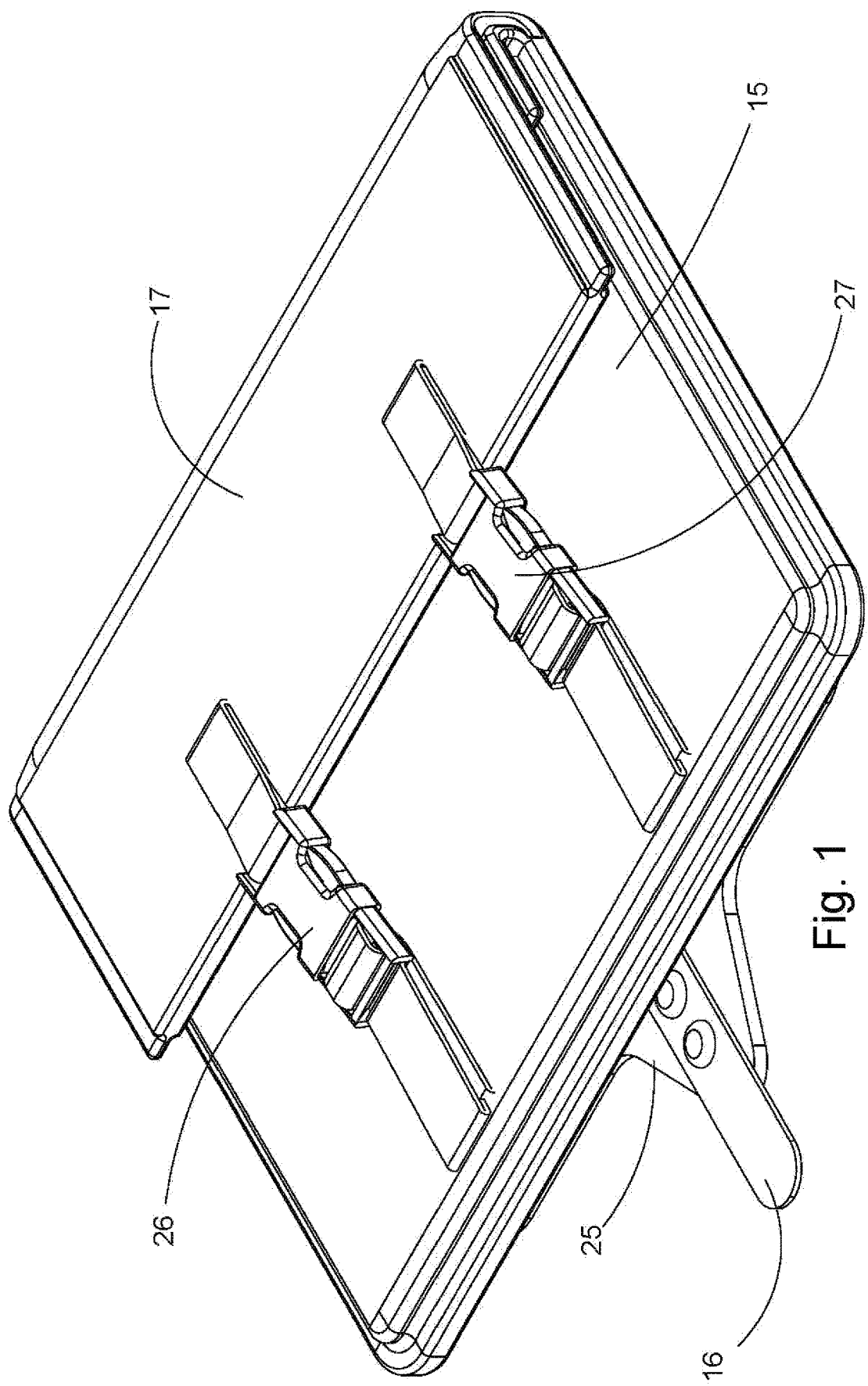
FIG. 1 is an isometric view of a bag of an embodiment of the invention.

FIG. 1 shows an embodiment of the invention. The bag 15 is essentially designed as a flat flexible bag which can be closed at its opening by a flap 17. In addition, a zipper can be used. The flap 17 is secured by means of conventional buckles 26 and 27. The bag 15 can be removed from a retaining plate 19 by means of a securing tab 16.

FIG. 2 shows the pocket or bag 15 in front view with flap 17, buckles 26 and 27 and the securing tab 16 which is fastened to the bag and can be fixed to a projection 25 of the rear holding plate by means of push buttons.

In FIG. 3, the case or bag 15 is shown in a sectional view along the line A-A of FIG. 2. The bag has only a narrow receiving space 24, which, however, is sufficient to accommodate a tablet computer, mobile telephones or devices of similar size.

The rear side of the bag 15 has an opening, which can be closed by a zipper, of an insertion pocket into which a stabilizing element 20 is inserted. The stabilizing element 20 can be coupled to a retaining plate 19 arranged in parallel thereto, with button-like projections 22 of the stabilizing element 20 engaged in slots of holders 23 fastened to the retaining plate 19.

When the bag 15 is displaced upwards in parallel movement along the retaining plate 19, the projections 22 release from the slots of the holders 23 so that the bag can be removed from the retaining plate 19. In order to prevent unintentional displacement and release of the bag (for example by means of forces which occur during a flight) from the holders, the bag preferably has a securing device which can be in the form of the securing tab 16 which contains snap fastener elements 18 which engage in counterparts on the projection 25 of the retaining plate 19. The separation of the bag 15 and the retaining plate 19 is thus possible only when the snap fastener elements 18 have been released by pre-drawing the tab 16.

Figure 4:
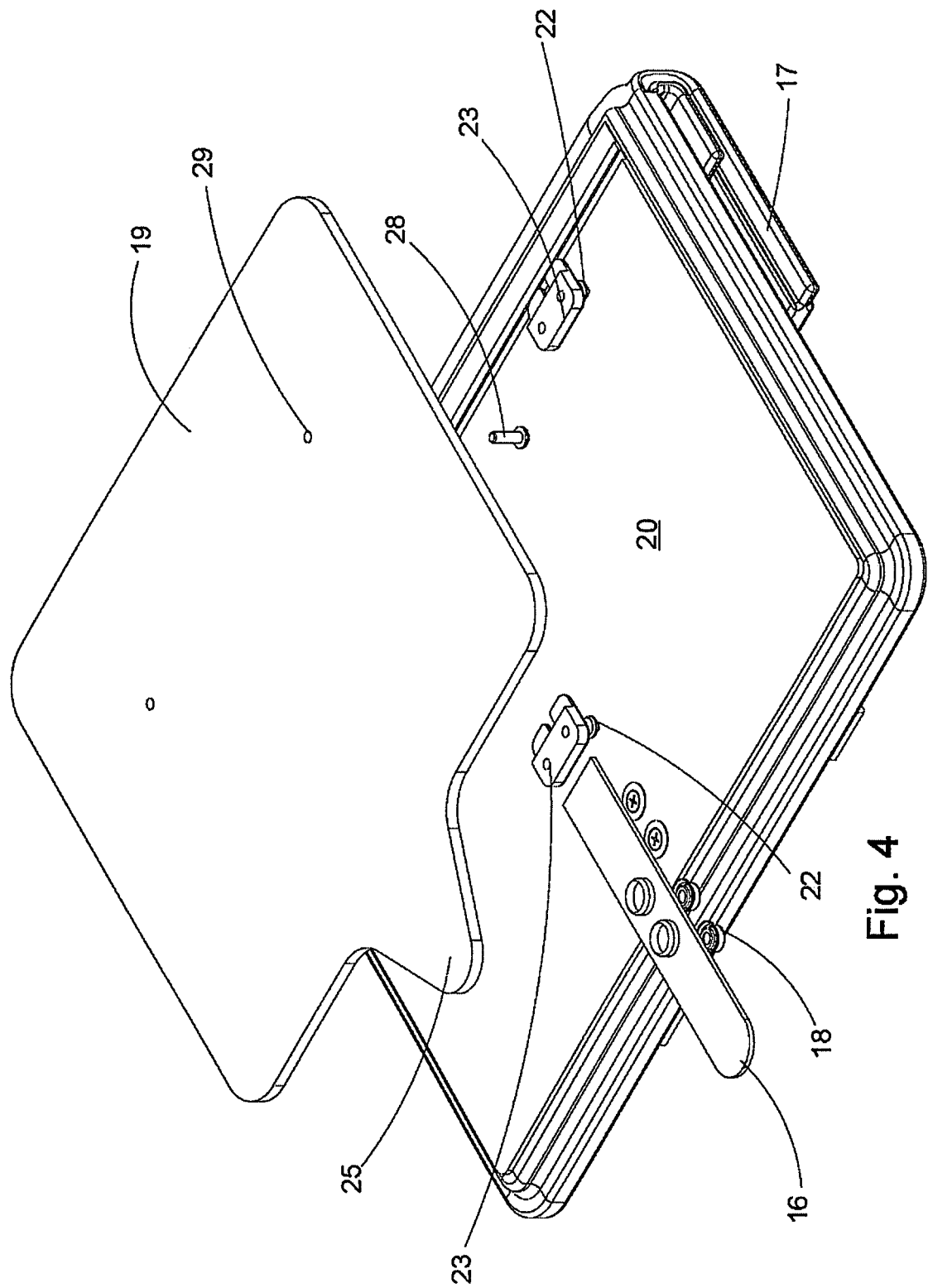
FIG. 4 shows an exploded view of the rear side of the bag.

FIG. 4 shows an exploded perspective view of the rear side of the bag 15 with holders 23, the tab 16, the snap fasteners 18 and the retaining plate 19. This can be fastened by means of retaining pins 28 to a wall or another structural element, for example in an aircraft, through holes 29 in the retaining plate 19.

This bag can be used in particular in the passenger and cockpit areas of an aircraft when tablet computers are to be charged under safety conditions. In this case, the computer is inserted into the bag, wherein the charging cable can be led out of the bag 15 on one side of the flap 17.

The layers used for the pockets are sewn together in particular by a metal sewing thread covered with aramid. The bag 15 can have an outer layer of cotton material. This is followed by a layer of a glass fiber material in the form of a needle felt made of E-glass, which is non-ceramic and can withstand a temperature of 1000° C. and then a textured silica glass fabric in plain weave.

This invention can be used not only in airplanes, but in any type of flight apparatus and also in other industrial goods in which hazards are encountered by the use of lithium batteries.

REFERENCE NUMERALS

15 Bag
16 Securing tab
17 Flap
18 Snap fastener
19 Retaining plate
20 Stabilizing element
21 Fastening screw
22 Retaining pin/button-like projections
23 Holder
24 Receiving space
25 Projection
26 Buckle
27 Buckle

The invention claimed is:

1. A fire-retardant bag (15) for receiving flammable devices or energy stores including lithium-ion batteries, having an interior (24) for receiving such a device or energy store and having a wall surrounding the interior (24), wherein the wall is flexible and multi-layered with at least one layer of fire-retardant material which resists a temperature of >800° C. emanating from a device or energy store included in the interior (24), wherein the wall has a layer structure in the form of a layer of textile material, and at least one subsequent layer of silica-fiber or fabric material, and wherein the interior (24) can be closed in relation to the surroundings, characterized in that the rear side of the bag (15) is provided with an insertion pocket into which a plate-shaped stabilizing element (20) can be inserted and is contained, and including a plate-shaped retaining plate (19) arranged parallel to the stabilizing element, connected to the stabilizing element (20) via releasable means (22, 23); and the releasable means (22, 23) acting between the stabilizing plate and the retaining plate comprises slotted holders engageable by button-like projections, which engage in such a way that, when the pocket is displaced in the opening direction of the slots, a separation of the stabilizing element (20) and holding plate (19) takes place.

2. A fire-retardant bag (15) according to claim 1, characterized in that the bag (15) has outer holding elements for detachable connection to a structural part of an aircraft.

3. A fire-retardant bag (15) according to claim 1, characterized in that the pocket (15) has an outer supporting element for the manual transport of the pocket (15).

4. A fire-retardant bag (15) according to claim 1, characterized in that the pocket (15) has an outer supporting element for the manual transport of the pocket (15).

5. A fire-retardant bag (15) according to claim 1, characterized in that the pocket has a layer structure of its wall in the form of a layer of textile material with the following silica layer made of E-glass needle felt material and a woven silica layer in plain weave.

6. A fire-retardant bag (15) according to claim 1, characterized in that the pocket has a layer structure of its wall in the form of a layer of textile material with the following silica layer made of E-glass needle felt material and at least two woven silica layers with different binding.

7. A fire-retardant bag (1) according to claim 1, characterized in that the pocket (15) is provided with a cover flap (17) which can be closed and opened.

8. A fire-retardant bag (15) according to claim 1, characterized in that a securing device for preventing unintentional separation of the pocket and the retaining plate is provided between the pocket and the retaining plate.

9. A fire-retardant bag (15) according to claim 8, characterized in that a securing tab (16) is provided on the pocket that contains snap fasteners (18) which engage in counterparts on the retaining plate (19), and that a displacement and separation of the retaining plate (19) and stabilizing element (20) from one another is possible only after the snap fasteners (18) and their counterparts thereof have been separated from one another by actuating the securing tab (16).

* * * * *